United States Patent [19]

Morita et al.

[11] Patent Number: 4,975,502

[45] Date of Patent: Dec. 4, 1990

[54] PROCESS FOR EMULSION POLYMERIZATION

[75] Inventors: Shigeru Morita; Shinji Tanaka, both of Osaka; Masahiko Oka, Shiga, all of

[73] Assignee: Daikin Industries Ltd., Osaka, Japan

[21] Appl. No.: 283,913

[22] Filed: Dec. 13, 1988

[30] Foreign Application Priority Data

Dec. 15, 1987 [JP] Japan ..................................... 319561

[51] Int. Cl.$^5$ ............................................... C08F 2/28
[52] U.S. Cl. .................................. 526/214; 526/209; 526/217; 526/247
[58] Field of Search ................ 526/247, 209, 214, 247

[56] References Cited

U.S. PATENT DOCUMENTS

| | | | |
|---|---|---|---|
| 4,667,000 | 5/1987 | Ohmor et al. | 526/247 |
| 4,694,045 | 9/1987 | Moore | 526/247 |
| 4,766,190 | 8/1988 | Morita et al. | 526/247 |

*Primary Examiner*—Bernard Lipman
*Attorney, Agent, or Firm*—Birch, Stewart, Kolasch & Birch

[57] ABSTRACT

A monomer which is hardly souble in water is effectively emulsion polymerized or copolymerized in the presence of a polymerization initiating source when the polymerization is carried out in the presence of a monovalent cation.

12 Claims, No Drawings

PROCESS FOR EMULSION POLYMERIZATION

BACKGROUND OF THE INVENTION

1. Field of the Invention

The present invention relates to a process for emulsion polymerization. More particularly, the present invention relates to a process for emulsion polymerizing a monomer which is hardly soluble in water.

2. Description of the Related Art

In general emulsion polymerization, at least one monomer and a polymerization initiator are added in an amount of water and polymerized, if desired, in the presence of an emulsifier and a buffer while keeping a polymerization system in an emulsified state.

When a monomer which is hardly soluble in water is to be emulsion polymerized, its polymerization rate is very low, since it diffuses into an aqueous phase at an extremely slow diffusion rate. In order to efficiently polymerize such a monomer on a commercial scale, it is necessary to increase the reaction rate and the diffusion rate through the increase of the reaction temperature. However, polymerization at a high temperature is not economical. Alternatively, it may be possible to accelerate the polymerization of monomer which is hardly soluble in water with the use of a larger amount of the emulsifier so as to improve the solubility and dispersibility of the monomer in water. However, the use of an emulsifier in a larger amount makes it difficult to separate the emulsifier from the resulting polymer. When the monomer which is hardly soluble in water is copolymerized with another monomer, the other monomer is preferentially polymerized so that the copolymer produced contains only very small amount of the monomer which is hardly soluble in water.

Various proposals have been made to increase the polymerization rate in an emulsion polymerization or to solve the problem of non-uniform consumption of the monomers during copolymerization. For example, Japanese Pat. Kokai Publication No. 223007/1986 discloses copolymerization of a perfluorovinyl ether with other fluoroolefins in the presence of a specific emulsifier. Japanese Pat. Kokai Publication No. 89713/1987 proposes the use of hexafluoropropylene as a third monomer so as to stably emulsion polymerize a perfluorovinyl ether and tetrafluoroethylene with good reproducibility.

SUMMARY OF THE INVENTION

An object of the present invention is to provide a process for effectively polymerizing at least one monomer which is hardly soluble in water at a high reaction rate.

This and other objects are accomplished by a process for emulsion polymerizing at least one monomer which is hardly soluble in water in the presence of a polymerization initiating source, wherein the polymerization is carried out in the presence of a monovalent cation.

DETAILED DESCRIPTION OF THE INVENTION

In general, a monomer to be emulsion polymerized has a small degree of solubility in water. Certain types of monomers are hardly soluble in water. For example, a fluoro(vinyl ether) of the formula:

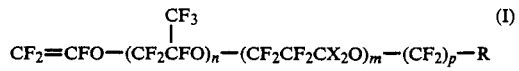

wherein X is independently a hydrogen atom, a fluorine atom or a chlorine atom, R is $CF_3$ or $CH_2Y$ (in which Y is an iodine atom, a bromine atom or a chlorine atom), m is a number of 0 to 10, n is a number of 0 to 10 and p is a number of 0 to 3 provided that the sum of m and n (m+n) is from 1 to 10 is known to be extremely hardly soluble in water.

Among the monomers which are hardly soluble in water, are those which are liquid under polymerization conditions are preferable polymerized by the process of the present invention.

A preferred example of a monovalent cation is an ammonium ion ($NH^{4+}$), although alkali metal ions can be used. When the alkali metal ion is used, it is preferably used together with the ammonium ion. In such a case, the amount of the ammonium ion is such that a molar ratio of the ammonium ion to the total molar amount of all of the monovalent cations in the polymerization system is from 0.4 to 1.

The monovalent cation is supplied to the polymerization system in the form of an inorganic salt. As an anion which forms the inorganic salt, a mono- or di-valent anion is preferred. Examples of the monovalent anion are halide ions (e.g. fluoride ion, chloride ion, bromide ion and iodide ion). Examples of the divalent anion are sulfate ion, sulfite ion and hydrogen phosphate ion.

Preferred examples of the inorganic salt are $NH_4Cl$, $(NH_4)_2SO_3$, $NaCl$, $Na_2SO_3$, $NaHSO_3$ and the like. These salts can be used independently or as a mixture of two or more of these salts. Among these salts, $NH_4Cl$ and its mixture with at least one of the other inorganic salts are particularly preferred.

The amount of the inorganic salt to be added to the polymerization system is so selected that a total amount of the cations (including a cation emanated from the emulsifier when it is used) is at least $2.5 \times 10^{-1}$ gram ion/liter.

To initiate the polymerization, any one of the known polymerization initiating sources may be used.

In the emulsion polymerization according to the present invention, the emulsifier may be present in the polymerization system. As the emulsifier, any of the conventional emulsifiers can be used. Among these emulsifiers, a compound of the formula:

wherein $R_f$ is a $C_1$–$C_{12}$ perfluoroalkyl group, X' is a fluorine atom or a trifluoromethyl group, q is 0 or 1, r is a number of 0 to 30 and M is a hydrogen atom, an ammonium group or an alkali metal.

During the polymerization, preferably the amounts of the compounds contained in the polymerization system are so adjusted that a surface tension of the aqueous medium containing the monovalent cation(s), the accompanied anion(s) and the emulsifier is maintained at 17 dyne/cm or less, more preferably at 16 dyne/cm or less. The pH of the aqueous medium is preferably from 6 to 10.

To the polymerization system, a chain transfer agent may be added to control the molecular weight of the produced polymer. Examples of the chain transfer agent are $C_4$–$C_6$ hydrocarbons, alcohols, ethers, organic halogen-containing compounds (e.g., $CCl_4$, $CBrCl_3$, $CF_2BrCFBrCF_3$, etc.) and iodide compounds including diiodide compounds (e.g. $CF_2I_2$, $I(CF_2)_4I$, $CF_2=CFCF_2CF_2I$, etc.).

A comonomer which can be copolymerized with the monomer which is hardly soluble in water may be any of the fluorine-containing ethylenically unsaturated compounds. Among the fluorine-containing ethylenically unsaturated compounds, preferred is a compound of the formula:

$$CZ_2=CZ_2 \qquad (III)$$

or $$CF_2=CFO-(CF_2)_pR \qquad (IV)$$

wherein R and p are the same as defined above, Z is independently a hydrogen atom, a fluorine atom, a chlorine atom, a bromine atom, an iodine atom or a trifluoromethyl group provided that at least one Z is the fluorine atom or the trifluoromethyl group, the number of the iodine atom or the bromine atom is zero or one and the number of the trifluoromethyl group is zero, one or two.

Particularly preferred examples of the unsaturated compounds are vinyl fluoride, vinylidene fluoride, tetrafluoroethylene, trifluoroethylene, 1-chloro-2-fluoroethylene, 1-chloro-1-fluoroethylene, chlorotrifluoroethylene, trifluorobromoethylene, trifluoroiodoethylene, hexafluoropropylene, perfluoro(methyl vinyl ether), perfluoro(propyl vinyl ether) and an ethylenically unsaturated compound of the formula:

$$CF_2=CF-O-CF_2Q \qquad (V)$$

wherein Q is a halogen atom, as well as mixtures thereof.

According to the process of the present invention, the monomer which is hardly soluble in water can be very effectively polymerized since its polymerization reactivity is increased. In the case of a copolymerization of the monomer which is hardly soluble in water with another monomer, the former can be effectively copolymerized, so that an elastomeric copolymer can be easily produced. Further, the amount of the emulsifier can be reduced in comparison with those present in a conventional emulsion polymerization.

PREFERRED EMBODIMENTS OF THE INVENTION

The present invention will be illustrated by the following Examples.

EXAMPLE 1

In a glass-made one liter autoclave equipped with a magnetic stirrer, pure water (500 ml), $C_3F_7OC_3F_6OCF(CF_3)$—$COONH_4$ (hereinafter referred to as the "Emulsifier") (50 g) and NaCl (1.634 g) were charged and dissolved followed by the addition of $Na_2SO_3$ (0.880 g). After evacuating the autoclave and replacing the interior atmosphere with a nitrogen gas, $C_3F_7[(CF_2)_3O]_2CF=CF_2$ (150 g) was charged. Again, the autoclave was evacuated and the interior atmosphere was replaced with tetrafluoroethylene. Then, at 15° C., the autoclave was pressurized to 2.04 kg/cm²G with tetrafluoroethylene and further to 3.0 kg/cm²G with hexafluoropropylene. At this stage, the gaseous composition in the autoclave interior atmosphere contained about 35 % by mole of hexafluoropropylene.

Then, a solution of ammonium persulfate (hereinafter referred to as "APS") (5 mg) in pure water (5 ml) was injected into the autoclave with tetrafluoroethylene while stirring the content in the autoclave at 720 rpm. The polymerization was initiated and the interior pressure dropped When the pressure dropped to 2.8 kg/cm²G, $I(CF_2)_4I$ (1.0 g) was injected with tetrafluoroethylene. Thereafter, when the pressure dropped to 2.0 kg/cm²G, it was increased to 3.0 kg/cm²G with the injection of tetrafluoroethylene. While keeping the temperature at 15° C., the polymerization was continued for 9 hours during which the decrease and increase of pressure were repeated as above. After the polymerization period, a solution of hydroquinone (100 mg) in pure water was injected with tetrafluoroethylene to terminate the polymerization. After purging the interior gas from the autoclave, a transparent dispersion (780.7 g) was recovered.

To the dispersion, pure water (430 g), acetone (450 ml) and then hydrochloric acid (150 ml) were added and stirred to coagulate a produced polymer, which was washed with acetone twice and dried under a reduced pressure at 100° C. to obtain an elastomeric polymer (145.9 g).

In this Example, the total cation amount was 0.2788 gram ion/liter, a molar ratio of the ammonium ion to other monovalent cations was 0.700, and pH of the reaction system was about 7.

COMPARATIVE EXAMPLE 1

In the same manner as in Example 1 but adding no NaCl and using 20 mg of APS, the polymerization was continued for 33.7 hours to obtain a clouded dispersion (817.5 g). After was kept this dispersion standing, the unreacted vinyl ether (48.75 g) was separated in the lower phase. The remaining layer was coagulated and dried in the same manner as in Example 1 to obtain a resinous polymer (92.84 g).

In this Comparative Example, the total cation amount was 0.1958 gram ion/liter, a molar ratio of the ammonium ion to the other monovalent cations was 0.997, and pH of the reaction system was about 7.

EXAMPLE 2

According to the procedures in Example 1 but using $(NH_4)_2SO_3.H_2O$ in place of $Na_2SO_3$, 500 ml of pure water 25 g of the Emulsifier and 4.101 g of $NH_4Cl$ were charged in the autoclave, and only tetrafluoroethylene was injected to pressurize the autoclave interior to 3.0 kg/cm²G. Then 5 mg of APS was added to initiate the polymerization and the interior pressure was regulated between 2.5 kg/cm²G and 3 kg/cm²G during polymerization. When the amount of tetrafluoroethylene added reached 57.5 g (after 5.5 hours of polymerization), the addition of tetrafluoroethylene was stopped and the polymerization was further continued while stirring till the pressure dropped to 49 cmHg to obtain a transparent dispersion (777.9 g). The dispersion was coagulated and dried in the same manner as in Example 1 to obtain an elastomeric polymer (186.6 g).

In this Example, the total cation amount was 0.2788 gram ion/liter, a molar ratio of the ammonium ion to other monovalent cations was 1.0, and pH of the reaction system was about 7.

COMPARATIVE EXAMPLE 2

According to the procedures in Example 1, 500 ml of pure water, 50 g of the Emulsifier, 5.0 g of $Na_2HPO_4.12H_2O$ and 20 mg of $Na_2SO_3$ were charged into the autoclave. Then 20 mg of APS was added to initiate the polymerization and additionally 4 mg of APS was added during polymerization. When the amount of tetrafluoroethylene added reached 57.5 g (after 4.65 hours of polymerization), the addition of tetrafluoroethylene was stopped and the polymerization was further continued while stirring till the pressure dropped to −50 mmHg to obtain a clouded viscous dispersion. The dispersion was coagulated and dried in the same manner as in Example 1 to obtain a resinous or hard rubbery polymer (153.5 g).

In this Comparative Example, the total cation amount was 0.2516 gram ion/liter, a molar ratio of the ammonium ion to other monovalent cations was 0.776, and pH of the reaction system was about 7.

EXAMPLES 3-5

In the same manner as in Example 1 but employing the conditions specified in Table 1 and using the emulsifier in an amount of 50 g in Example 3 or 25 g in Examples 4 and 5, the polymerization was carried out. In Example 4, the final pressure was −55 mmHg.

The polymer yields are shown in Table 1.

TABLE 1

| Example No. | 3 | 4 | 5 |
| --- | --- | --- | --- |
| $Na_2SO_3$ (g) | 0.8798 | — | — |
| $(NH_4)_2SO_3$ (g) | — | 0.9367 | 0.9367 |
| NaCl (g) | 1.63 | — | — |
| $NH_4Cl$ (g) | — | 4.101 | 4.101 |
| APS (g) | 15 | 5 (+6) | 5 |
| Polymerization time (hrs) | 2.1 | 5.1 | 4.4 |
| Dispersion (g) | 810.8 | 777.9 | 787.2 |
| Polymer yield (g) | 174.7 | 201.8 | 213.2 |
| Total cation amount (gram ion/l) | 0.2788 | 0.2788 | 0.2788 |
| Molar ratio of $NH^{4+}$/cations | 0.700 | 1.0 | 1.0 |
| pH | ca. 7 | ca. 7 | ca. 7 |

COMPARATIVE EXAMPLE 3

According to the procedures in Example 1, 500 ml of pure water and 0.8798 g of $NA_2SO_3$ were charged in the autoclave, and tetrafluoroethylene was injected to pressurize the autoclave interior to 2.04 $kg/cm^2G$ and hexafluoropropylene to 3 $kg/cm^2G$. Then 3 mg of APS was added to initiate the polymerization and the interior pressure was regulated during the polymerization with the addition of tetrafluoroethylene. The polymerization was continued for 24.2 hours to obtain a clouded dispersion (782.4 g). The dispersion was coagulated and dried in the same manner as in Example 1 to obtain a resinous polymer (107.2 g).

In this Comparative Example, the total cation amount was 0.223 gram ion/liter, a molar ratio of the ammonium ion to other monovalent cations was 0.87, and pH of the reaction system was about 7.

EXAMPLE 6

In the same manner as in Comparative Example 3 but using 1.7595 g of $Na_2SO_3$ and additionally 1.4520 g of $NaHSO_3$, the polymerization was carried out for 33 hours to obtain a transparent dispersion (784.5 g). The dispersion was coagulated to obtain an elastomeric polymer (147.9 g).

In this Example, the total cation amount was 0.3066 gram ion/liter, a molar ratio of the ammonium ion to other monovalent cations was 0.64, and pH of the reaction system was about 7.

EXAMPLES 7-11

In the same manner as in Example 3 but using the inorganic salt shown in Table 2 and the emulsifier in an amount of 50 g in Examples 7-10 or 25 g in Example 11, regulating the reaction pressure between 2 $kg/cm^2G$ and 2.2 $kg/cm^2G$ and additionally adding tetrafluoroethylene four times (about 5 g of the total amount of tetrafluoroethylene), the polymerization was carried out. The results are shown in Table 2. All the polymers produced in Examples 7-11 were elastomeric.

TABLE 2

| Example No. | 7 | 8 | 9 | 10 | 11 |
| --- | --- | --- | --- | --- | --- |
| $Na_2HPO_4.12H_2O$ (g) | 5 | — | — | — | — |
| $Na_2SO_3$ (g) | 0.0205 | 0.8798 | 0.8798 | 0.8798 | — |
| $(NH_4)_2SO_3$ (g) | — | — | — | — | 0.9367 |
| NaCl (g) | — | 1.63 | 3.27 | 4.90 | — |
| $NH_4Cl$ (g) | — | — | — | — | 4.101 |
| Polymerization time (hrs) | 1.25 | 0.75 | 1.25 | 1.25 | 1.17 |
| Dispersion (g) | 755.7 | 721.4 | 720.0 | 723.3 | 697.2 |
| Polymer yield (g) | 17.2 | 20.4 | 16.6 | 17.1 | 10.8 |
| Vinyl ether content (%) | 23 | 24 | 25.7 | 26 | 28 |
| Total cation amount (gram ion/liter) | 0.2518 | 0.2788 | 0.3348 | 0.3906 | 0.2788 |
| Molar ratio of $NH^{4+}$/cations | 0.775 | 0.700 | 0.583 | 0.500 | 1.0 |

What is claimed is:

1. A polymerization process which comprises emulsion polymerizing at least one hardly soluble in water fluoro(vinyl ether) monomer of the formula:

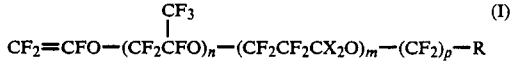

wherein X is independently a hydrogen atom, a fluorine atom or a chlorine atom, R is $CF_3$ or $CH_2Y$ (in which Y is an iodine atom, a bromine atom or a chlorine atom), m is a number of 0 to 10, n is a number of 0 to 10 and p is a number of 0 to 3 provided that the sum of m and n (m+n) is from 1 to 10, wherein the polymerization is carried out in the presence of:

a polymerization initiating source,
an emulsifier compound of the formula:

wherein $R_f$ is a $C_1$-$C_{12}$ perfluoroalkyl group, X' is a fluorine atom or a trifluoromethyl group, q is 0 or 1, r is a number of 0 to 30 and M is a hydrogen atom, an ammonium group or an alkali metal, a chain transfer agent in which said chain transfer agent is an iodine compound selected from the group consisting of $CF_2I_2$, $I(CF_2)_4I$ and $CF_2=CFCF_2CF_2I$, and a monovalent cation in which said monovalent cation is an ammonium ion emanated from an inorganic salt, the amount of the inorganic salt is so selected that a total amount of the cations (including a cation emanated from the emulsifier when it is used) is at least $2.5 \times 10^{-1}$ gram ion/liter, and the molar ration of the ammonium ion to the total molar amount of all the monovalent cations in the polymerization system is from 0.4 to 1.

2. The process according to claim 1, wherein the monomer which is hardly soluble in water is copolymerized with at least one other monomer.

3. The process according to claim 2, wherein the other monomer is a fluorinecontaining ethylenically unsaturated compound.

4. The process according to claim 1, wherein the monomer which is hardly soluble in water is a liquid under the polymerization conditions.

5. The process according to claim 1, wherein said monovalent cation is emanated from an inorganic salt with a mono-or di-valent anion.

6. The process according to claim 5, wherein the anion is a chloride ion.

7. The process according to claim 1, wherein the ammonium ion is used in combination with at least one other cation.

8. The process according to claim 3, wherein the ethylenically unsaturated compound is a compound of the formula:

$$CZ_2=CZ_2 \qquad (III)$$

or $$CF_2=CFO-(CF_2)_pR \qquad (IV)$$

wherein R and p are the same as defined above, Z is independently a hydrogen atom, a fluorine atom, a chlorine atom, a bromine atom, an iodine atom or a trifluoromethyl group with the proviso that at least one Z is the fluorine atom or the trifluoromethyl group, the number of the iodine atom or the bromine atom is zero or one and the number of the trifluoromethyl group is zero, one or two.

9. The process according to claim 8, wherein the ethylenically unsaturated compound is at least one member selected from the group consisting of vinyl fluoride, vinylidene fluoride, tetrafluoroethylene, trifluoroethylene, 1-chloro-2-fluoroethylene, 1-chloro-1-fluoroethylene, chlorotrifluoroethylene, trifluorobromoethylene, trifluoroiodoethylene, hexafluoropropylene, perfluoro(methyl vinyl ether), perfluoro(propyl vinyl ether) and an ethylenically unsaturated compound of the formula:

$$CF_2=CF-O-CF_2Q \qquad (V)$$

wherein Q is a halogen atom.

10. The process according to claim 1, wherein a surface tension of the polymerization medium is maintained at 17 dyne/cm or less.

11. The process according to claim 1, wherein the pH of the polymerization medium is from 6 to 10.

12. The process according to claim 1, which produces an elastomeric polymer.

* * * * *